United States Patent [19]

Whiteside et al.

[11] Patent Number: 4,555,377

[45] Date of Patent: Nov. 26, 1985

[54] THERMOFORMING METHODS AND APPARATUS

[75] Inventors: Robert C. Whiteside, Harrison; Albert W. Arends, Gladwin; Roland Karklin, Beaverton, all of Mich.

[73] Assignee: Leesona Corporation, Beaverton, Mich.

[21] Appl. No.: 526,077

[22] Filed: Aug. 24, 1983

[51] Int. Cl.$^4$ ............................................. B28B 11/08
[52] U.S. Cl. ................................. 264/292; 38/102.91; 156/242; 156/443; 156/494; 264/290.2; 425/383; 425/388; 425/397
[58] Field of Search ...................... 425/383, 388, 397; 156/242, 443, 494; 65/273; 264/290.2, 292; 38/102.91

[56] References Cited

U.S. PATENT DOCUMENTS

| | | | |
|---|---|---|---|
| 1,895,309 | 1/1933 | Boomershine | 38/102.91 |
| 2,912,716 | 11/1959 | Frownfelter et al. | 425/73 |
| 2,918,696 | 12/1959 | Bottoms et al. | 264/290.2 |
| 3,025,566 | 3/1962 | Kostur | 425/167 |
| 3,176,349 | 4/1965 | Meisner et al. | 425/305.1 |
| 3,466,706 | 9/1969 | Asano | 425/384 |
| 3,600,746 | 8/1971 | Kostur et al. | 425/383 |
| 3,664,791 | 5/1972 | Brown | 425/156 |
| 3,779,687 | 12/1973 | Alesi | 425/383 |
| 3,810,731 | 5/1974 | Anderson | 425/388 |
| 3,868,209 | 2/1975 | Howell | 425/157 |
| 3,978,905 | 9/1976 | de Lama et al. | 38/102.91 |
| 4,239,472 | 12/1980 | Atkinson et al. | 425/388 |
| 4,406,729 | 9/1983 | Elias | 156/481 |
| 4,430,814 | 2/1984 | Wulc | 38/102.91 |
| 4,430,815 | 2/1984 | Wulc | 38/102.91 |
| 4,471,543 | 9/1984 | Wolsey | 38/102.91 |

Primary Examiner—Jay H. Woo
Assistant Examiner—Timothy W. Heitbrink
Attorney, Agent, or Firm—Learman & McCulloch

[57] ABSTRACT

Thermoforming machines with a heating station and a downstream mold station have carrier clamp frames for gripping the edges of sheets of plastic at a load station and indexing them successively to a heating station and a mold station. The carrier frame members to which the plastic may be releasably clamped carry their own remotely operated clamps and are themselves expandable and contractible to a condition in which, prior to molding, they control the sag in the sheet formed during heating of the sheets of differential pressure forming temperature. The plastic sheet can be molded to only a portion of a product which functions as a mold member.

10 Claims, 9 Drawing Figures

THERMOFORMING METHODS AND APPARATUS

FIELD OF THE INVENTION

This invention relates to differential pressure forming methods and apparatus, and more particularly to the type of thermoforming machine which provides a plurality of plastic sheet clamp frame carriers which move from a load station to a heating station and thence to a molding station. Once molded, the product formed can be removed from the carrier frame in which it has been transported to the various stations, and a new thermoplastic sheet can be reloaded. Apparatus of this character conveniently often is embodied in what is called a rotary machine, having a plurality of stations in which the sheet carriers move in indexed movements in a circuit from a sheet loading station through the various stations and back to the sheet loading station.

Typical patents which are of the type indicated are the following: U.S. Pat. Nos. 2,912,716; 3,025,566; 3,176,349; 3,466,706; 3,664,791; 3,779,687; 3,810,731; 3,868,209; 4,239,472.

BACKGROUND OF THE INVENTION

Previously, in such machinery, it has not been possible to remove sag which is created when the sheets are heated to deforming temperatures. This is particularly a problem when large sheets of, for example, 30×42 inches in size, and larger, are involved.

One of the prime objects of the invention is therefore to provide a clamp frame carrier assembly which is so constructed as to provide a new method of removing sag formed in the sheet when the thermoplastic sheet is raised to thermoforming temperatures. Previously, also, in such machinery, plastic sheet have not, to our knowledge, been molded to only a portion of an underlying panel or product which functions as the mold, and to which the plastic is to adhere to form the article, and the method which has been developed and is disclosed in the present application is able to accomplish this in an efficient and reliable manner, and to do so in a manner which molds two products at a time. In the present case, for example, a single molding operation may utilize a single sheet of plastic and mold it to partially cover the desired areas of both a left hand and right hand door panel for an automotive vehicle.

Still another object of the invention is to provide a thermoforming machine of the character involved which is capable of being used in automotive production lines, operating at the high speeds demanded.

Still another object of the invention is to provide a carrier frame which, with slight modification, may be used reversely to increase the sag or drape in the plastic sheet being processed.

Still a further object of the invention is to provide a sag removing sheet carrier assembly which is capable of stretching the plastic to better condition it from an orientation and stability standpoint.

Still another object of the invention is to provide a method and machine which is capable of processing a wide variety of synthetic plastic sheets such as polystyrene, polyethylene, polyvinyl chloride, polypropylene and others.

BRIEF SUMMARY OF THE INVENTION

Thermoforming machines with a heating station and a downstream mold station have carrier clamp frames for receiving sheets of plastic and moving them successively to the heating station and on to the mold station. Carrier frame members to which the plastic may be releasably clamped carry their own remotely operated clamps and are themselves swingable to a position in which they remove sag from the sheet. In the method disclosed, the plastic sheet can be molded to only a portion of a product which functions as a mold member.

Other objects and advantages of the invention will be pointed out specifically or will become apparent from the following description when it is considered in conjunction with the appended claims and the accompanying drawings wherein:

IN THE DRAWINGS

GENERAL DESCRIPTION

Figure 1:
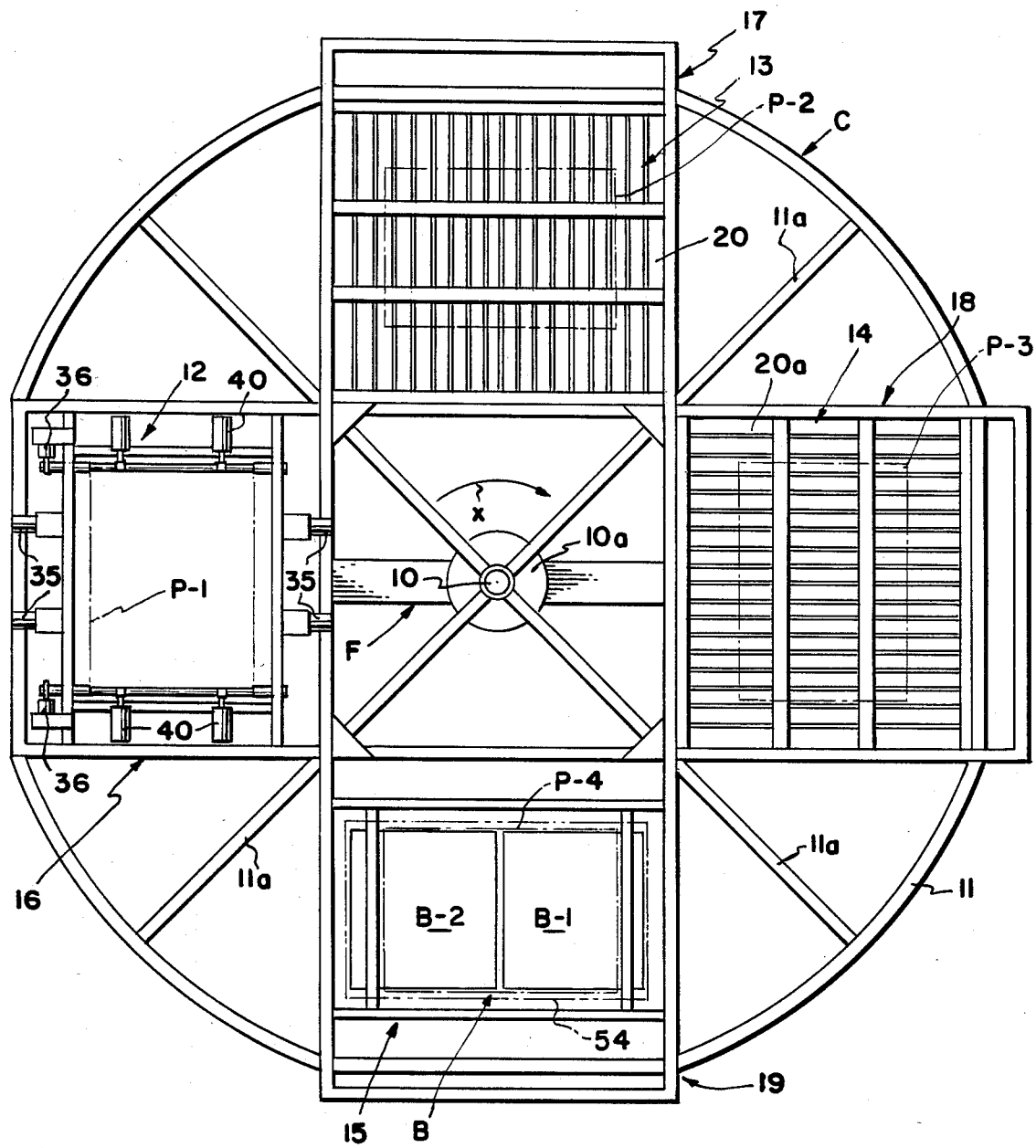
FIG. 1 is a top plan view, somewhat schematically depicting a machine of the type with which the invention may be employed.

Attention is first of all directed to FIG. 1 which illustrates a thermoforming machine in which a rotary, plastic sheet-supporting carrier or turntable generally designated C is mounted for rotary indexing movement on a fragmentarily illustrated, stationary base or frame F, as by an upright central shaft 10 journaled by a suitable bearing 10a supported by frame F.

The turntable C includes a circular outer ring 11 having radial spokes 11a fixed to the central shaft 10, and, as illustrated, includes four circuitously arranged sheet supporting, clamp frame assemblies or sheet carriers generally designated 12, 13, 14 and 15 for gripping the edges of deformable webs or sheets of synthetic plastic thermoplastic material P1, P2, P3, and P4. The clamp frame assembly 12 at a loading-reclamping station 16 is the only one not hidden in this view by other elements. The sheets P1-P4 may be on the order of thirty-six to forty-eight inches in size, or larger, and typically may be 0.2 to 0.25 inches in thickness and may comprise polystyrene, polyethylene, or polypropylene sheets, for example. Other plastic sheets of a thermoplastic nature will, of course, also be processible in the machine which will be described for forming relatively large size products on the order of interior door panels for automotive vehicles.

Provided on the frame F, beside loading-reclamping station 16, are first and second heating stations 17 and 18, and a forming or molding station, generally designated 19. Any suitable drive, such as that disclosed in U.S. Pat. No. 3,868,209, which is incorporated herein by reference, may be utilized for indexing the turntable C to successively move the sheets P1–P4 to the various stations in a clockwise path as shown at x. The clamp sheets P1–P4 supported on the turntable C are successively incrementally indexed from the loading-reloading station designated 16, between vertically spaced banks of heaters 20 and 20a at typical first and second sheet-heating stations 17 and 18, respectively, and then are indexed to a position in vertical alignment with a mold assembly B at the forming station 19. The molded product is unloaded there and then returned to loading-reclamping station 16 for reloading. Conventional Geneva, or other apparatus, can be employed to ensure that the turntable C is repeatedly indexed in 90° increments after a predetermined dwell time.

Figure 5:
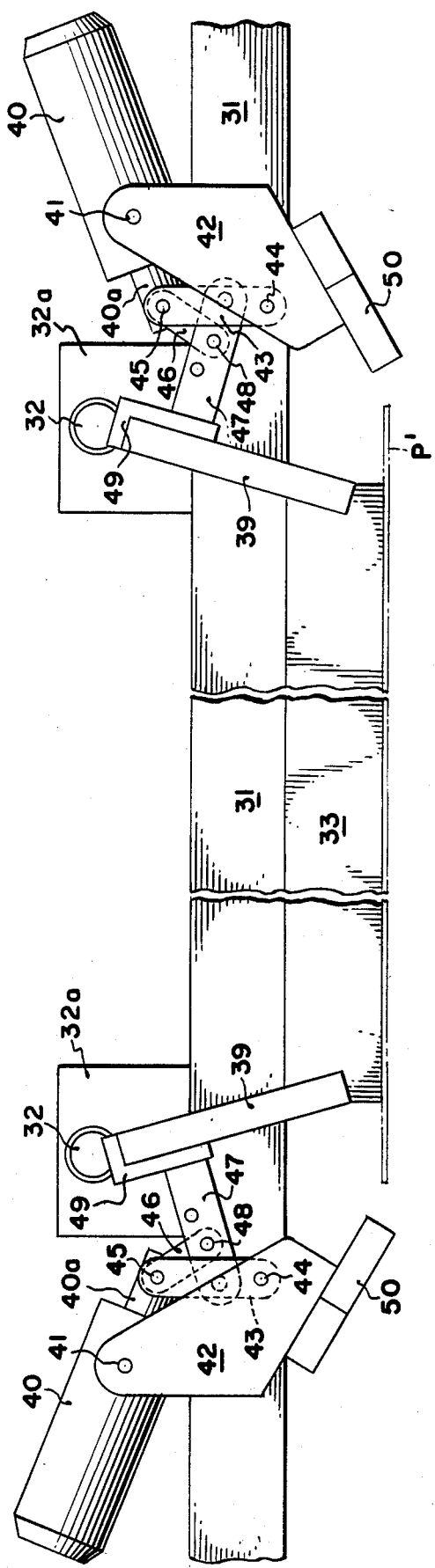
FIG. 5 is a side elevational view taken at the loading station where the plastic sheet is to be initially loaded to and gripped by the sheet-carrying frame.
Figure 5:
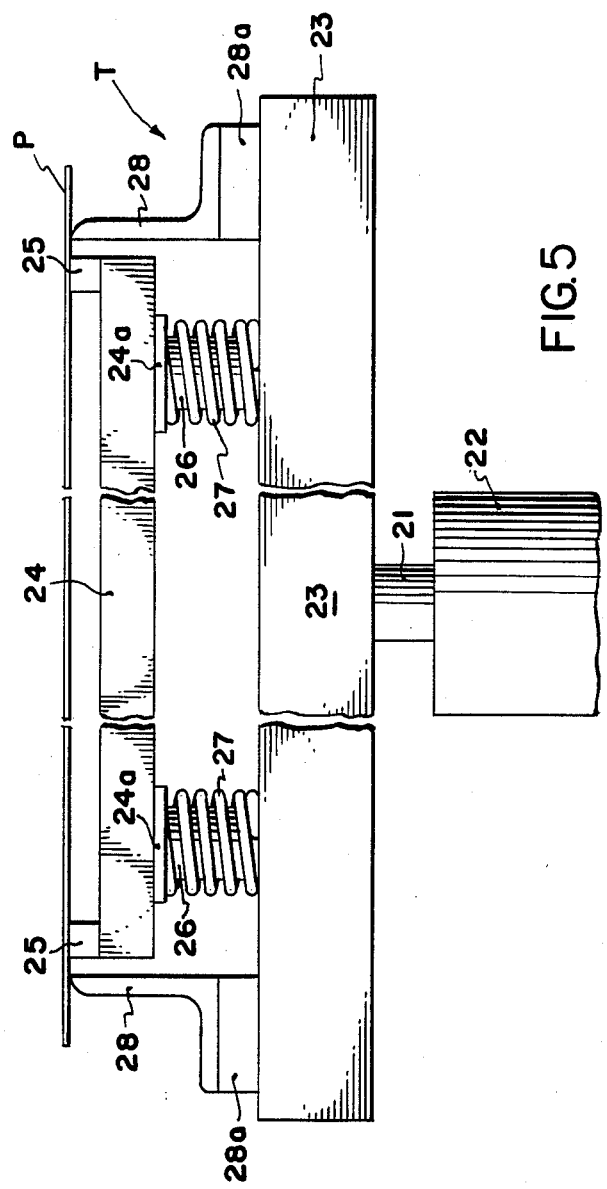

As FIG. 5 indicates, the sheet supply carrier or table generally designated T at loading-reloading station 16, is operated by the piston rod 21 of a conventional, single acting, solenoid actuated, spring returned, fluid pressure operated cylinder 22 for vertical movement between the lowered sheet receiving position in which sheet P is shown, and the raised sheet discharging position indicated by sheet P', adjacent one of the clamp frame assemblies 12–15. Each of the clamp frame carrier assemblies 12–15 for clamping the plastic sheets is identical, and therefore only one will be described in detail.

Figure 7:
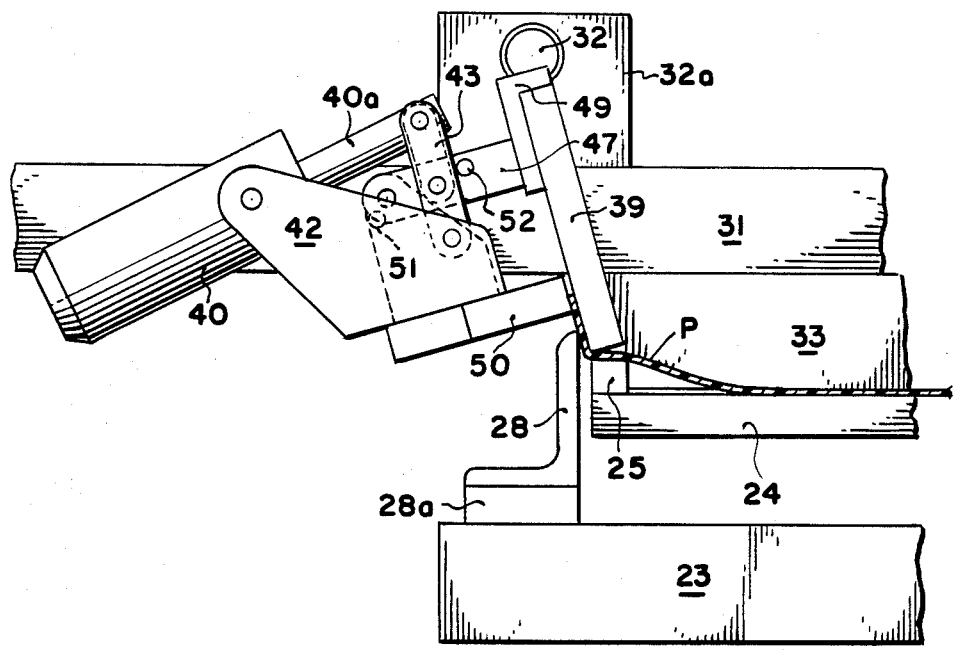

Referring now again particularly to FIG. 5, the elevatable table assembly T includes a base 23 and a sheet supporting platform 24 having upwardly projecting plastic web supporting blocks 25. Platform 24 is provided with bosses 24a which are slidably received on pins 26, fixed to the base 23, and coil springs 27 are provided to normally support the platform 24 in the position in which it is shown in FIG. 7. At opposite sides of base 23, angle members 28 are supported on blocks 28a, as shown, outboard of the platform 24.

THE CLAMP FRAME ASSEMBLIES

Each of the carrier assemblies 12–15 comprise a pair of side rails 31 supporting members between which the plastic sheets P1–P4 are clamped. Shafts 32, supported by bearing 32a on the ends of the rails 31, span the rails 31. Each of the shafts 32 is operated via a crank arm 38 connected with the piston rod 37 of a cylinder 36 carried by a bracket 38a connected to one end of side rail 31. As will become apparent, shafts 32 are swung by cylinders 36 through only a very limited arc of rotation and have dependent clamp members 39 extending substantially the full width of the plastic sheet carried which function as backer members against which the end edges of the plastic sheet are clamped.

Double acting, solenoid operated cylinders 40 pivotally carried at 41 by an ear bracket 42 supported by the backer plates 39 in a manner to be detailed, are actuable to extend their piston rods 40a as shown in FIG. 7, to clamp the plastic web P which has been folded up around the lower edge of members 39 as shown in FIG. 7 by the raising of the angle members 28. Each piston rod 40a is connected by links 43 to the bracket 42 by way of pivot pins 44 carried on the ear elements, the links 43 being pivotally connected at their upper ends at 45, to the clevised end of the piston rod 40a. A link 46 embraced by the clevis end of each piston rod 40a and mounted on the same pin 45, extends to mount to a bar 47 at 48, and it will be seen that bar 47 mounts an angle member 49 which fixes to the upper end of the pivotal backer plate 39 and thereby supports each cylinder 40 and its associated assembly on the member 39.

Figure 9:
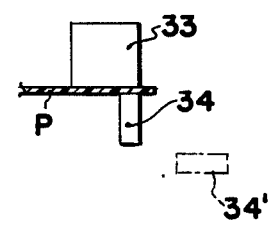
FIG. 9 is a schematic, fragmentary view, illustrating a conventional clamp of the type used at the side of each clamp frame assembly.
Figure 2:
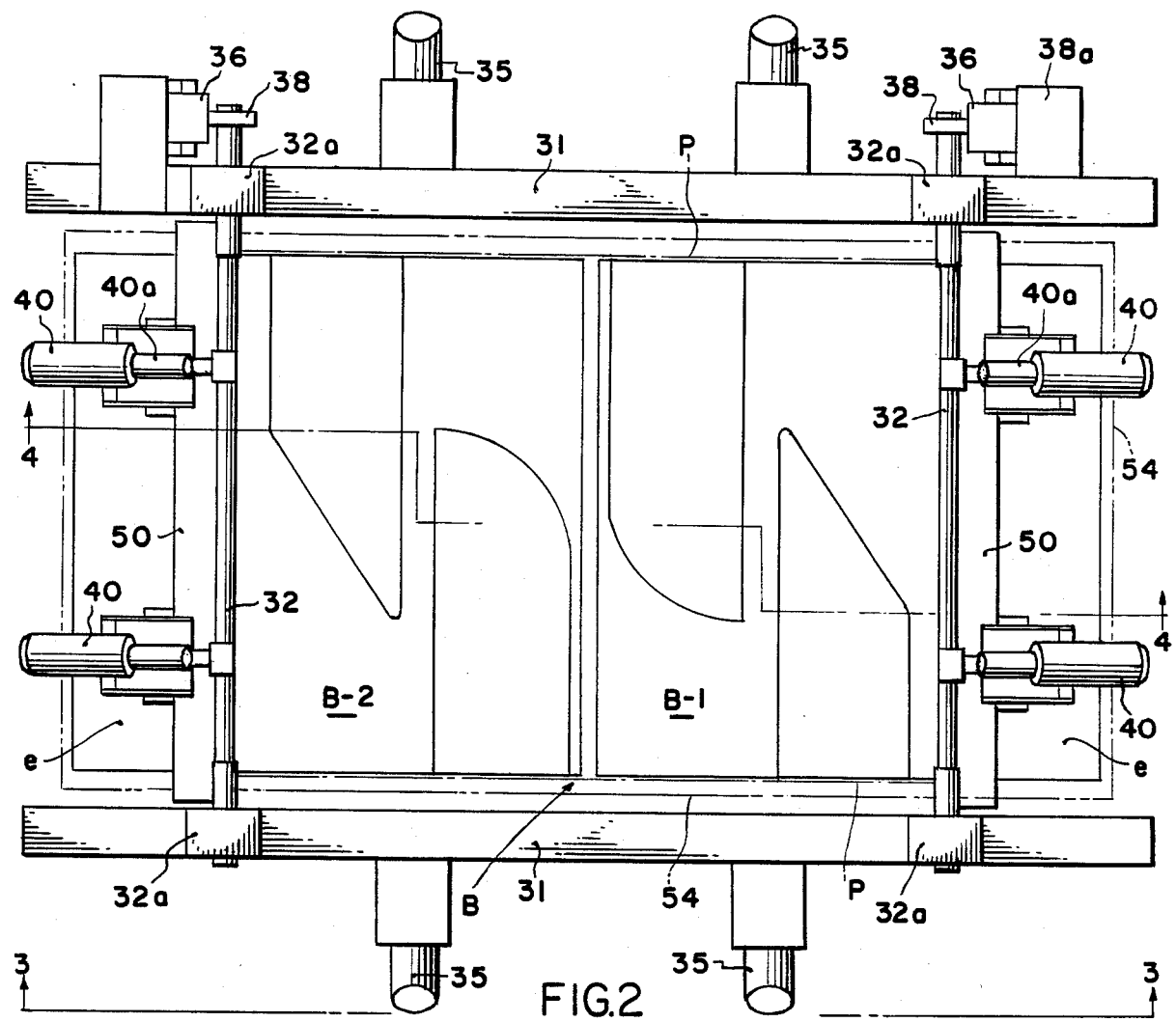
FIG. 2 is a considerably enlarged top plan view of the mold area of the machine showing a molded product and illustrating the construction of the carrier for the plastic sheet.
Figure 3:
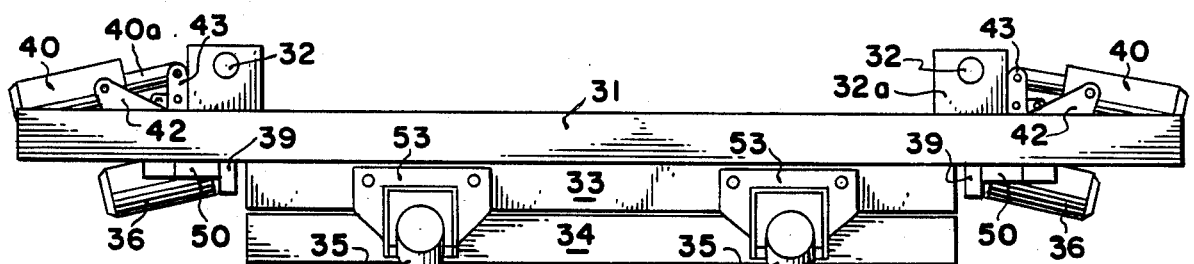
FIG. 3 is a side elevational view thereof, taken on the line 3—3 of FIG. 2.
Figure 6:
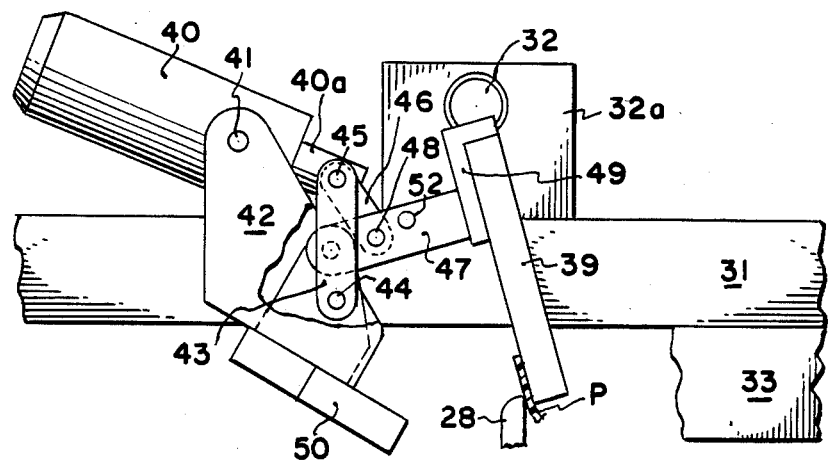
FIGS. 6-8 are enlarged, fragmentary, partly schematic, side elevational views illustrating the sequential manner in which the web is clamped and conditioned for molding.

When each piston rod 40a is extended as in FIG. 7, the clamp plate 50 which is carried on the lower end of each bracket 42 is moved from the position shown in FIG. 6, to the FIG. 7 position to clamp the ends of the plastic sheet P against the outboard sides of the backer plate members 39 in a folded up position. Stop pins 51 and 52 (See FIG. 7) operate to limit movement of each link 43 to keep the movement of plate 50 within the range of movement disclosed in FIGS. 6 and 7. At the sides of the rails 31, fixed frame members 33 secured thereto, cooperate with upwardly pivoted frame members 34 to clamp the side edges of the plastic sheet P4 therebetween in the usual manner, cylinders 35 being employed to move the members 34 to and from locked position via suitable linkage. FIG. 9 illustrates the clamped and unclamped positions of the frame members 34.

The operation of the clamp frames 34 is schematically illustrated in FIG. 9. Double acting, solenoid operated cylinders 35, which of course also could be single acting, spring returned solenoid operated cylinders, are carried on brackets 53 secured to the fixed frame members 33, with their piston rods connected with the movable frame 34 in such manner as to swing them outwardly clear of the plastic sheet P from the clamping position to the release position, shown at 34'. Clamp apparatus of this type is conventional and mentioned in U.S. Pat. No. 3,868,209. Alternatively, the construction shown in U.S. Pat. No. 3,810,731 to clamp the sheet P from the bottom may be employed, or the clamp assemblies used at the ends of the frame to remove sag may also be used at the sides.

THE MOLD STATION

Figure 4:
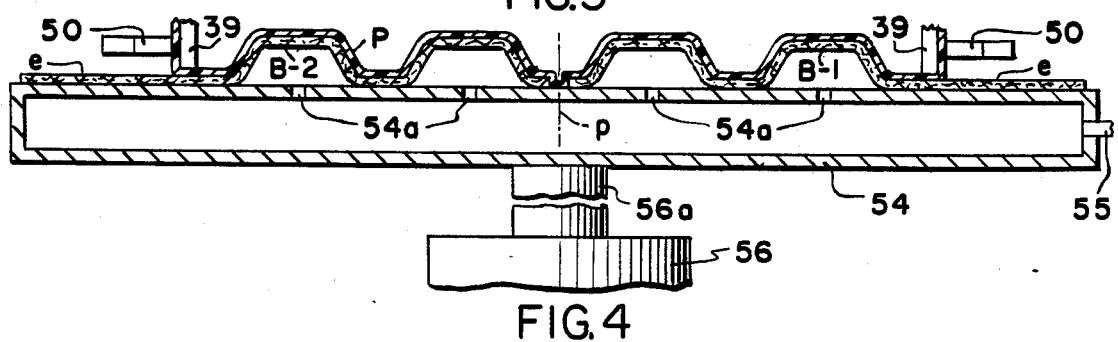
FIG. 4 is a fragmentary, sectional side elevational view taken on the line 4—4 of FIG. 2 and particularly illustrating the product which is formed at the mold station.

FIG. 4 illustrates a typical product which can be fabricated on the machine. The view is taken at the mold station, and discloses a hollow platen or platform 54 which is connected via a suction line 55 with a suitable vacuum pump or the like. The platen 54 may be moved upwardly and downwardly by a suitably powered double-acting, solenoid operated air cylinder 56, having its piston rod 56a connected with the platen 54. A pair of contoured fiber boards B-1 and B-2 having a three-dimensional contour, and to which the plastic P is to be partially adhered, are loaded to the top of platen 54, which as will be noted has perforations 54a, and it is to be understood that the fiberboard is perforate or porous so that the plastic P can be drawn by suction forces down into intimate molding contact with the contours of the boards B-1 and B-2. In this way, a pair of articles can be formed at the same time, it being only necessary to cut through the plastic sheet at the parting line p, when the molding operation has been completed and unloading occurs. In the present instance, the contoured fiberboards B-1 and B-2 are interior door panels for automobiles with arm rests formed therein, and the plastic is to cover only a portion of the product, leaving the panels at e exposed so that a suitable fabric or the like can later be adhered to the panel in another operation. The upper surfaces of boards B-1 and B-2 are in the embodiment disclosed treated with an adhesive which becomes tacky when contacted and heated by the hot plastic sheet P during the molding operation. Preferably, boards B-1 and B-2 are preheated to facilitate this.

THE OPERATION

In FIG. 1, the various plastic sheets have been referred to as P1 through P4, for purposes of convenience, whereas in other views the plastic sheet has simply been referred to by the letter P. At load station 16, the mechanism will be initially in the position shown in FIG. 5. The operator then loads a new plastic sheet P to the platform blocks 25, and activates a switch which operates cylinder 22 to raise table T. At this time the plates 39 are in the downwardly divergent, inwardly inclined position, shown in FIG. 5, and the clamp plates 50, which cooperate with them, are swung outwardly away from them, as illustrated. FIG. 6 also illustrates this position of the clamp frame parts, but shows the end members 28 on table T folding the ends of plastic sheet P upwardly along the outboard sides of the plate 39 at each end, in position to receive clamp plates 50.

Figure 8:
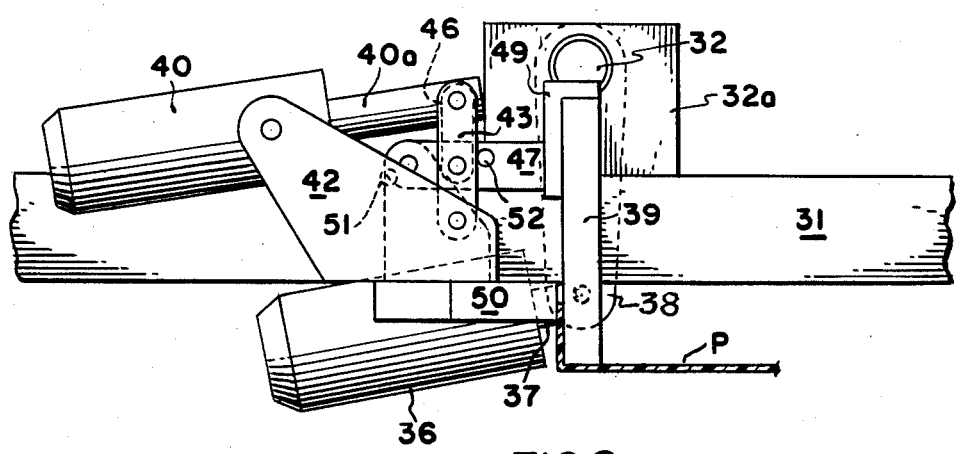

The table T remains in the up position until cylinders 40 are activated to extend piston rods 40a and swing the clamp plates 50 in to clamp the end edges of the plastic sheet P to the outboard sides of clamp backer plates 39. At the same time, cylinders 35 can be activated to clamp the sides of the sheet between members 33 and 34. Then the table T lowers to original position and the clamp frame carrier moves successively in indexed increments to stations 17 and 18, where the clamped interior portion of the plastic sheet P is brought to thermoforming temperature. In this condition, it will have developed some sag in the mid-portion of the sheet P. After the carrier leaves station 18, the cylinders 36 are activated, and crank arms 38 connected to their piston rods swing the shafts 32, and accordingly the plates 39, to the truly vertical position, shown in FIG. 8. Since the end edges of the plastic sheet P remains clamped at this time, the plastic sheet is thus, stretched endwisely in the sense of removing undesirable sag. Of course, if the particular molding operation required more drape or sag, the cylinders 36 could be operated to swing the plates 39 in the opposite direction to a more divergent position to provide this option.

In the molding operation which has been disclosed, the sag removal is completed by the time a molding operation occurs at the molding station 15. At the molding station, the side-by-side boards B-1 and B-2 have been loaded to the platen 54, and clamps or stops (not shown) or the like, may be located thereon in a manner such that they cannot shift their position. The boards B-1 and B-2 in this operation, function as a composite mold member. While not shown in FIG. 4, an upper mold which has the contour indicated, may also be provided when there is a reason to use one. With the sag removed to the desired controlled extent by the outward pivoting of plates 39, cylinder 56 is operated to raise the platen 54 to engage the plastic sheet P with the mold boards B-1 and B-2. At this time a valve (not shown) operates in the usual manner to communicate the platen 54 with a suitable source of vacuum and the hot deformable plastic sheet P is drawn down into intimate engagement with the boards B-1 and B-2.

Only parts of the boards B-1 and B-2 are contacted by the plastic P which becomes adhesively secured to the boards B-1 and B-2 because the hot plastic tends to adhere thereto and as a result of activation of the coating of adhesive on those portions of the boards. At their ends, the boards B-1 and B-2 remain free of a plastic covering as illustrated at e. With the molding operation completed, the platen 54 is lowered. In this position, cylinders 35 and 40 are operated to release the carrier frame clamp plates 34 and 50 respectively so that the composite product fabricated can be removed by machine or the operator. During indexing of the carrier frame back to the loading station, the cylinders 36 operate to return the plates 39 to the inwardly swung position.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a thermoforming method for a machine having, a load station with a platform to receive a thermoplastic sheet to be molded where said thermoplastic sheet has edges overhanging the platform and said machine further comprising a heating station with a heating mechanism therein, a downstream mold station with a differential pressure mold member for differential pressure forming articles in thermoplastic sheets, and a conveying clamp frame carrier for the plastic sheets which moves in a path from the heating station to the mold station; said carrier comprising an expandable and contractible side frame assembly, with a pair of relatively movable opposed side frames, each of said opposed side frames having a movable clamp thereon, said frame assembly perimetrally defining an open mid-portion of a size to expose the mid-portion of a clamped sheet to heat at the heating station, one of said side frames having a generally vertical extending outboard surface for coaction with the clamp thereon where said clamp is movable angularly toward and away from said outboard surface the steps of:
    a. relatively moving said carrier and platform vertically to fold at least one entire edge of a sheet generally vertically out of the plane of the sheet to a position alongside the said generally vertically extending outboard surface;
    b. releasably clamping opposed edges of said sheet, to the carrier including the step of moving the clamp carried by said one side frame angularly toward said outboard surface to clamp the folded edge against said outboard surface and, transferring the carrier to the heating station; and heating the clamped sheet to a forming temperature;
    c. transferring the carrier with the heated sheet to the mold station and relatively moving said one side frame and said opposed side frame to change the generally horizontal distance between said clamps on the opposed side frames and vary the sag in said sheet developed in the heating thereof;
    d. relatively moving the mold member and carrier from a removed position to a sheet engaging position in which the mold member is in general planar alignment with said carrier; and
    e. applying a differential pressure to conform the sheet to the mold member.

2. The method of claim 1 wherein said relatively movable side frame along with said clamps are movable in an outwardly direction to remove sag from the said heated sheet when said folded edge is against said outboard surface.

3. The method of claim 1 wherein said relatively movable side frame along with said clamps are movable in an inwardly direction to increase the drape in a heated sheet when said folded edge is against said outboard surface.

4. In a thermoforming machine having a heating station with a heating mechanism therein, and a downstream mold station with a differential pressure mold member for differential pressure forming articles in thermoplastic sheets having perimetral edges surrounding a mid-portion, and wherein a conveying clamp frame carrier for the plastic sheets moves on a frame in a path from the heating station to the mold station; the improvement wherein
  a. said carrier comprises an expandable and contractible frame assembly perimetrally defining an open mid-portion of a size to expose the mid-portion of the clamped sheet to heat at the heating station while supporting edges of the sheet so that the sheet can be heated to a forming temperature;
  b. said frame assembly including generally vertically extending opposite side plate members having outboard sides, at least one said side plate members being mounted for vertical swinging movement about a generally horizontal axis, means operable for folding edges of a plastic sheet to be carried around said outboard side of said at least one sideplate member, and said at least one side plate member carrying a clamp, movable angularly to said outboard side of said at least one side plate member toward and away from released and gripping positions against said folded around edge and said outboard side, for gripping opposite perimetral edges of the sheet, and actuators for operating said clamps to grip and release the opposite edges of the sheet;
  c. means for relatively moving the mold member and carrier from a removed position to a sheet-engaging position in which the mold member is in general planar alignment with said carrier for receiving and forming the sheet; and
  d. means carried by said carrier operable to relatively swing said at least one side plate member vertically relatively to an opposed side plate member carrying a clamp about said axis to vary the generally horizontal distance between said opposed side plate members while said clamps are in gripping position, and before the mold member is in sheet-engaging position.

5. The machine of claim 4 wherein said machine includes a loading station upstream from the heating station to which the carriers are returned from the mold station.

6. The machine of claim 4 wherein said at least one side plate member along with said clamp is movable in an outwardly direction to remove sag from a heated sheet when said clamp is in a gripping position.

7. The machine of claim 4 wherein said at least one, side plate member along with said clamp is movable in an inwardly direction to increase the drape in a heated sheet when said clamp is in a gripping position.

8. The machine of claim 4 wherein means are provided for mounting said side plate members for swinging movement from a condition of vertically inclined divergence to a substantially vertical position.

9. The machine of claim 8 wherein said side plate members depend from parallel shafts carried on said carrier, and power drive means are carried by said carrier and revolve said shafts to swing said side plate members.

10. In a thermoforming machine having a load station with a platform to receive a thermoplastic sheet to be molded where said thermosplastic sheet has edges overhanging the platform and said machine further comprising a heating station with a heating mechanism therein, and a downstream mold station with a mold member for forming articles in thermoplastic sheets having perimetral edges surrounding a midportion, and wherein a conveying clamp frame carrier for the plastic sheet moves on a frame in a path from the heating station to the mold station; the improvement wherein
  a. said carrier comprises an expandable and contractible side frame assembly perimetrally defining an open midportion of a size to expose the midportion of the clamped sheet to heat at the heating station while supporting edges of the sheet so that the sheet can be heated to a forming temperature;
  b. said frame assembly including opposite side members, at least one of which has a generally vertically extending outboard side surface and which is mounted for movement toward and away from an opposite side member, said side members carrying clamps movable to and from released and gripping position for gripping opposite perimetral edges of the sheet, the clamp on said one side member being movable angularly toward said outboard side and away therefrom;
  c. means for relatively moving the carrier and platform for folding a perimetral edge of the sheet generally vertically out of the plane of the sheet to a position alongside said generally vertical outboard surface of the said one side member;
  d. actuators for operating said clamps to releasably grip the folded edge of the sheet against said generally vertical outboard surface and to grip the opposite edge of the sheet;
  e. means carried by said carrier operable to relatively move said generally vertical surface of the said one side member and opposite side member to vary the distance between the clamps on opposed side members while the clamps are in gripping position, and before the mold member is moved to sheet engaging position; and
  f. means for relatively moving the mold member and carrier from a removed position to a sheet-engaging position in which the mold member is in general planar alignment with said carrier for receiving and forming the sheet.

* * * * *